United States Patent
Mochizuki

(10) Patent No.: US 11,237,673 B2
(45) Date of Patent: Feb. 1, 2022

(54) OPERATION DETECTION DEVICE AND OPERATION DETECTION METHOD

(71) Applicant: MURAKAMI CORPORATION, Shizuoka (JP)

(72) Inventor: Takayoshi Mochizuki, Shizuoka (JP)

(73) Assignee: MURAKAMI CORPORATION, Shizuoka (JP)

(*) Notice: Subject to any disclaimer, the term of this patent is extended or adjusted under 35 U.S.C. 154(b) by 0 days.

(21) Appl. No.: 16/969,384

(22) PCT Filed: Feb. 5, 2019

(86) PCT No.: PCT/JP2019/004058
§ 371 (c)(1),
(2) Date: Aug. 12, 2020

(87) PCT Pub. No.: WO2019/159760
PCT Pub. Date: Aug. 22, 2019

(65) Prior Publication Data
US 2020/0401271 A1    Dec. 24, 2020

(30) Foreign Application Priority Data
Feb. 19, 2018    (JP) .............................. JP2018-026997

(51) Int. Cl.
*G06F 3/042* (2006.01)
*G01P 3/36* (2006.01)
*G01B 11/22* (2006.01)
(52) U.S. Cl.
CPC ............ *G06F 3/0425* (2013.01); *G01B 11/22* (2013.01); *G01P 3/36* (2013.01); *G06F 3/0421* (2013.01); *G06F 2203/04101* (2013.01)

(58) Field of Classification Search
CPC ......... G01B 11/22; G01P 3/36; G03H 1/2294; G03H 2226/05; G06F 2203/04101; G06F 3/017; G06F 3/0421; G06F 3/0425
See application file for complete search history.

(56) References Cited

U.S. PATENT DOCUMENTS

2015/0309584 A1    10/2015 Kawai et al.
2016/0092062 A1*   3/2016 Miyagi ............... G06F 3/04815
                                                                345/173
2017/0153712 A1    6/2017 Kawai et al.

FOREIGN PATENT DOCUMENTS

JP           4741488        8/2011
JP         2013-114647      6/2013
(Continued)

OTHER PUBLICATIONS

International Search Report issued in International Patent Application No. PCT/JP2019/004058, dated Apr. 16, 2019, along with an English translation thereof.
(Continued)

*Primary Examiner* — Afroza Chowdhury
(74) *Attorney, Agent, or Firm* — Greenblum & Bernstein, P.L.C.

(57) ABSTRACT

An operation detection device according to an embodiment includes: a display unit that displays an operation unit as a virtual image; a sensor that detects a position of an object approaching the operation unit; and a determination unit that determines whether or not the operation unit has been pressed based on the position of the object detected by the sensor. The determination unit determines that the operation unit has been pressed before the object reaches the operation unit.

11 Claims, 7 Drawing Sheets

(56) References Cited

FOREIGN PATENT DOCUMENTS

| JP | 2015-210684 | 11/2015 |
| JP | 2017-097716 | 6/2017 |
| WO | 2005/008378 | 1/2005 |

OTHER PUBLICATIONS

Translation of International Preliminary Report on Patentability issued in International Patent Application No. PCT/JP2019/004058, dated Apr. 16, 2019.

* cited by examiner

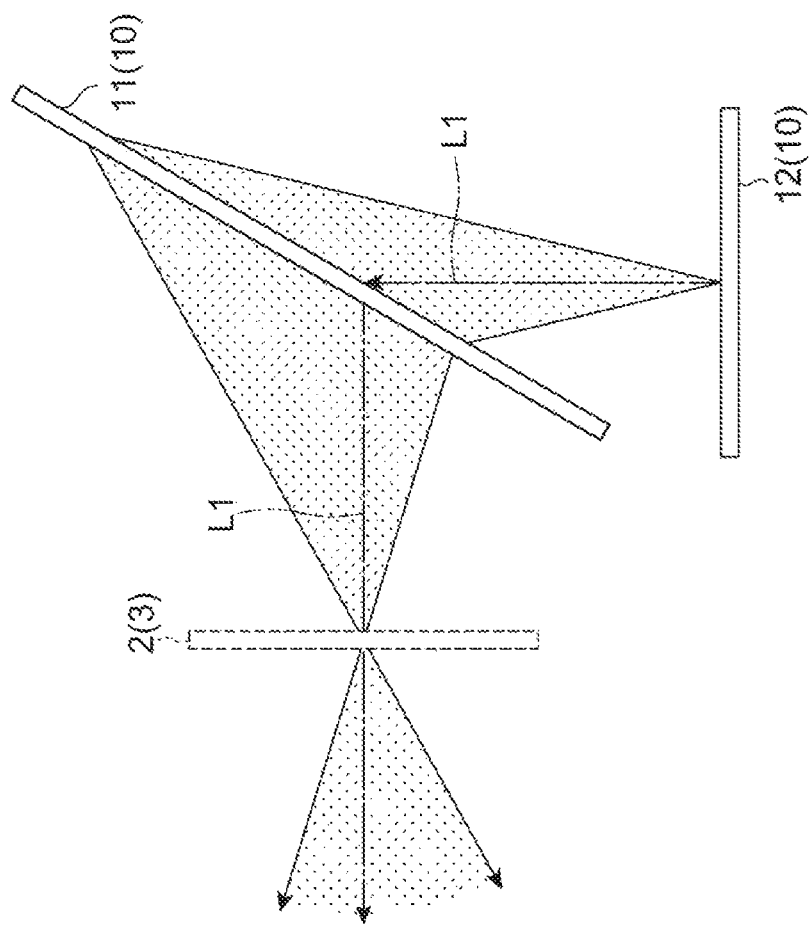
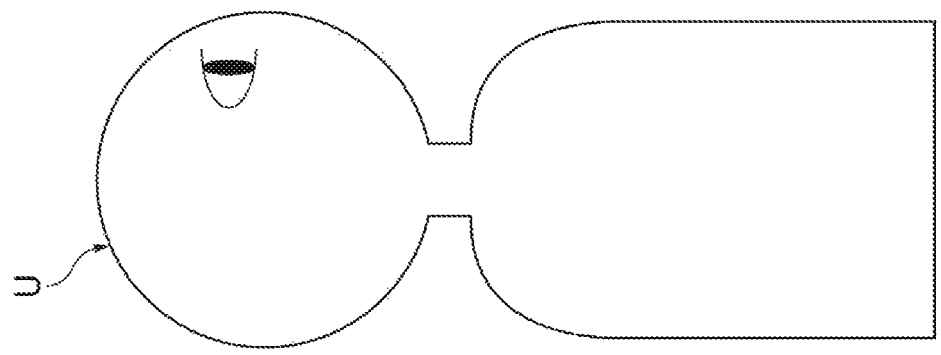
Fig.2

OPERATION DETECTION DEVICE AND OPERATION DETECTION METHOD

TECHNICAL FIELD

The present disclosure relates to an operation detection device and an operation detection method.

BACKGROUND ART

Patent Literature 1 discloses a holographic human machine interface (HMI) that detects an operation of an operator on an input device displayed as a holographic image. The HMI has an emitter/detector located behind the holographic image when viewed from the operator. The emitter/detector emits waves toward the holographic image. In this HMI, when an object (for example, an operator's finger) is present at a position where the holographic image appears, the wave from the emitter/detector is reflected by the object and is incident on the emitter/detector as a reflected wave. Due to this reflection, the emitter/detector detects an operation of the operator on the holographic image.

With this HMI, the operator's pressing operation on the input device displayed as a holographic image can be detected. The HMI can detect the operator's pressing operation on the input device by determining that the input device has been pressed when the object actually reaches the position of the input device.

CITATION LIST

Patent Literature

Patent Literature 1: Japanese Patent No. 4741488

SUMMARY OF INVENTION

Technical Problem

However, it may be difficult for the user (operator) to recognize the position where a virtual image, such as a holographic image, is formed. For this reason, a shift may occur between the position of the operation unit (input device) recognized by the user and the position of the operation unit that is actually formed as a virtual image. As a result, even if the user intends to press the operation unit with his or her finger or the like, the finger or the like may not actually reach the position of the operation unit. In this case, the above-described HMI does not determine that the operation unit has been pressed, even though the user thinks that the user has pressed the operation unit with his or her finger or the like. Therefore, with this HMI, the user may feel that the pressing operation on the operation unit is not performed as intended by the user.

With the above-described HMI, the user's pressing operation can be recognized when the object actually reaches the operation unit. In this HMI, since the operation of the device is started first when the object reaches the operation unit, the user may feel the reaction of the pressing operation slow. Therefore, the above-described HMI may cause the user to feel that the operability of the operation unit is not good.

It is an object of the present disclosure to provide an operation detection device and an operation detection method that allow a user to feel that the operability of an operation unit displayed as a virtual image is good.

Solution to Problem

An operation detection device according to an embodiment includes: a display unit that displays an operation unit as a virtual image; a sensor that detects a position of an object approaching the operation unit; and a determination unit that determines whether or not the operation unit has been pressed based on the position of the object detected by the sensor. The determination unit determines that the operation unit has been pressed before the object reaches the operation unit.

An operation detection method according to an embodiment includes: a step of detecting a position of an object approaching an operation unit displayed as a virtual image; and a step of determining that the operation unit has been pressed before the object reaches the operation unit.

In the operation detection device and the operation detection method described above, since the operation unit is displayed as a virtual image, the operation unit can be displayed as if the operation unit floats. By displaying the operation unit as if the operation unit floats in this manner, the visibility of the operation unit can be improved. In addition, in the operation detection device and the operation detection method described above, it is determined that the operation unit has been pressed before the object reaches the operation unit. That is, before the object reaches the operation unit, pressing determination indicating that the operation unit has been pressed is made. Therefore, the pressing determination is made before the object actually reaches the operation unit, and the operation of the device by the pressing operation on the operation unit can be performed early. As a result, the user can feel that the reaction of the pressing operation is good. By performing the pressing determination before the object reaches the operation unit, it is possible to suppress the occurrence of a phenomenon that the pressing determination is not made even though the user thinks that the operation unit has been pressed. Therefore, since it is possible to perform the pressing determination when the user thinks that the operation unit has been pressed, the user can feel that the pressing operation has been performed as intended by the user. Therefore, according to the operation detection device and the operation detection method described above, the user can feel that the operability of the operation unit is good.

The determination unit may determine that the operation unit has been pressed when the object reaches a pressing determination surface provided in front of the operation unit when viewed from the object. Therefore, it is possible to realize the pressing determination indicating that the object has been pressed with a simple configuration.

The determination unit may detect a speed of the object approaching the operation unit and determine whether or not the operation unit has been pressed based on the detected speed and the position of the object. For example, when the user slowly moves an object, such as a finger, to bring the object close to the operation unit, the user may recognize that the pressing determination has been made earlier than expected. On the other hand, as described above, when the pressing determination is performed based on the speed and the position of the object, the pressing determination can be performed based on the time-series change of the position of the object. Accordingly, the pressing determination can be performed after grasping the degree of progress of the operation of the object. Therefore, since it is possible to make a determination considering the prediction of the position of the object by performing the pressing determination on the operation unit based on the speed and the position of the object, it is possible to more accurately perform the pressing determination on the operation unit.

The sensor may be a depth sensor provided on a side opposite to the object with the operation unit interposed therebetween. Incidentally, when a deviation occurs between an approaching direction in which the object approaches the operation unit and each direction indicated by the coordinate axis of the depth sensor, it may be necessary to perform coordinate conversion processing on the coordinate system of the depth sensor in order to correctly detect the position of the object. On the other hand, when the depth sensor is provided on the side opposite to the object with the operation unit interposed therebetween, the depth sensor is disposed on the side opposite to the object when viewed from the operation unit, so that the load of the coordinate conversion processing described above can be reduced. Therefore, the processing load of the operation detection device can be reduced.

Advantageous Effects of Invention

According to the present disclosure, the user can feel that the operability of the operation unit displayed as a virtual image is good.

BRIEF DESCRIPTION OF DRAWINGS

FIG. 2 is a conceptual diagram illustrating a virtual image displayed by a display unit of the operation detection device illustrated in FIG. 1.

DESCRIPTION OF EMBODIMENTS

Figure 1:
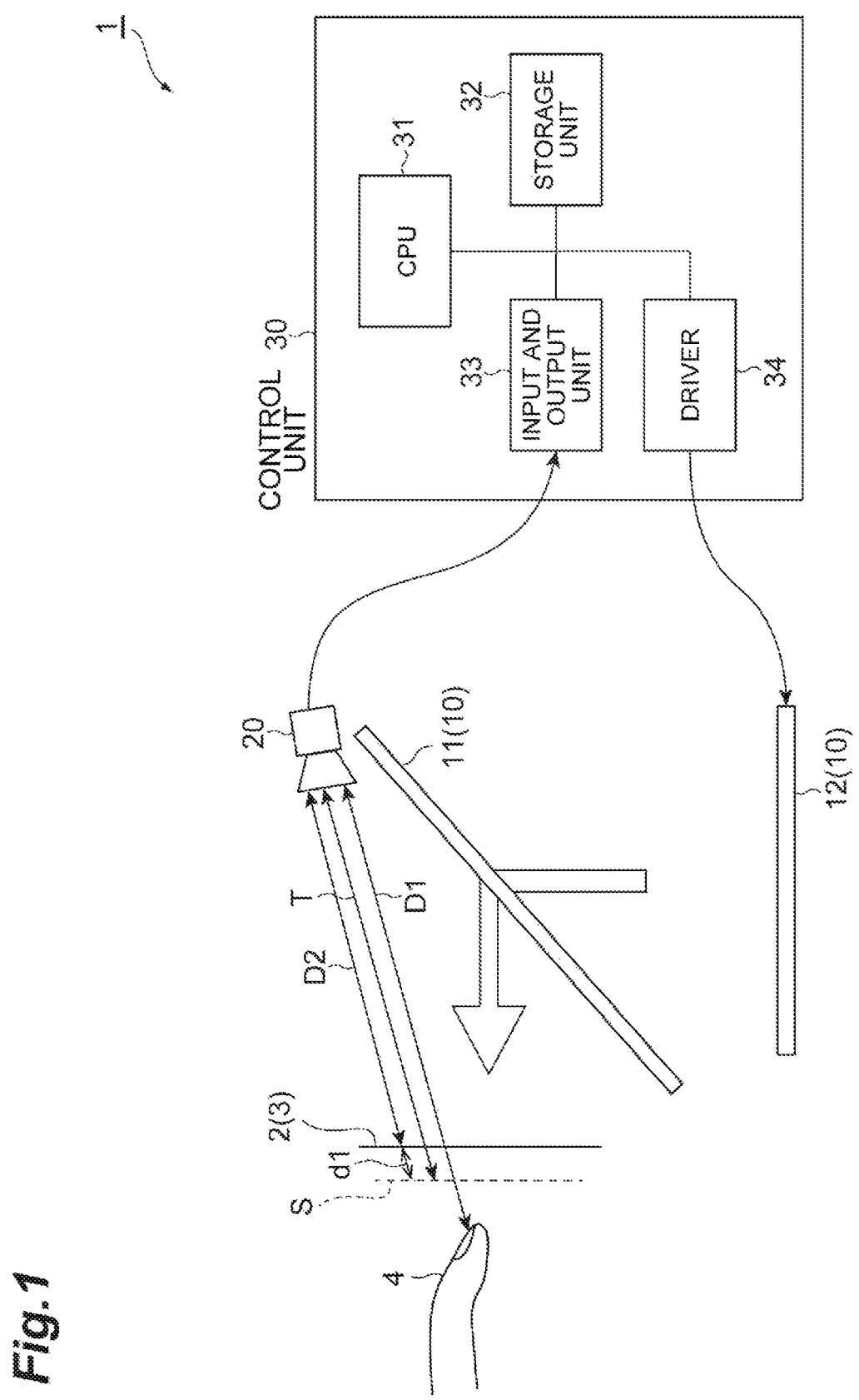
FIG. 1 is a configuration diagram illustrating an operation detection device according to an embodiment.

Hereinafter, embodiments of an operation detection device and an operation detection method according to the present disclosure will be described in detail with reference to the accompanying diagrams. In the description of the diagrams, the same elements are denoted by the same reference numerals, and the repeated description thereof will be appropriately omitted.

First Embodiment

FIG. 1 is a configuration diagram illustrating an operation detection device 1 of a first embodiment. The operation detection device 1 is, for example, an operation detection device that constructs an HMI (Human Machine Interface) between a vehicle and a passenger (user) of the vehicle. The operation detection device 1 displays an operation unit 2 in the air as a virtual image 3 on the front side when viewed from the user, and detects an object 4 approaching the operation unit 2. The operation unit 2 is, for example, a portion capable of operating each device mounted in the vehicle (for example, a vehicle-mounted back camera, an air conditioner, or the like), and is, for example, a button such as a switch displayed as the virtual image 3. The object 4 is for operating the operation unit 2 to operate the device, and is, for example, a user's finger or a rod-shaped object such as a pen.

The operation detection device 1 detects a pressing operation on the operation unit 2 by the object 4 based on the detected position of the object 4, and operates each device based on the detected operation. The pressing operation includes both an operation of pushing down the operation unit 2 and an operation of pushing up the operation unit 2. As illustrated in FIG. 1, the operation detection device 1 includes a display unit 10, a depth sensor 20 (sensor), and a control unit 30. The display unit 10 displays the operation unit 2 as the virtual image 3 in the air. The display unit 10 includes an AI (Aerial Imaging) plate 11 (registered trademark), which is an aerial image forming element, and a liquid crystal panel 12. The AI plate 11 is manufactured, for example, using a technique described in Japanese Patent No. 4865088.

The liquid crystal panel 12 is a display of a PC (personal computer), a tablet terminal, or a mobile terminal such as a mobile phone, for example. The liquid crystal panel 12 is arranged, for example, so that its display surface is approximately horizontal. The AI plate 11 is inclined with respect to the liquid crystal panel 12 (horizontal direction). The inclination angle of the AI plate 11 with respect to the liquid crystal panel 12 may be variable. The liquid crystal panel 12 displays an image based on the signal output from the control unit 30.

FIG. 2 is a conceptual diagram illustrating the virtual image 3 displayed by the display unit 10. As illustrated in FIG. 2, the image displayed on the liquid crystal panel 12 is displayed by the AI plate 11 as the virtual image 3 at a position on a user U side with respect to the AI plate 11 and the liquid crystal panel 12. For example, light L1 emitted upward from the liquid crystal panel 12 and incident on the AI plate 11 is reflected twice by the AI plate 11, and the virtual image 3 is formed in a space on the front side of the display unit 10 when viewed from the user U.

Figure 3:
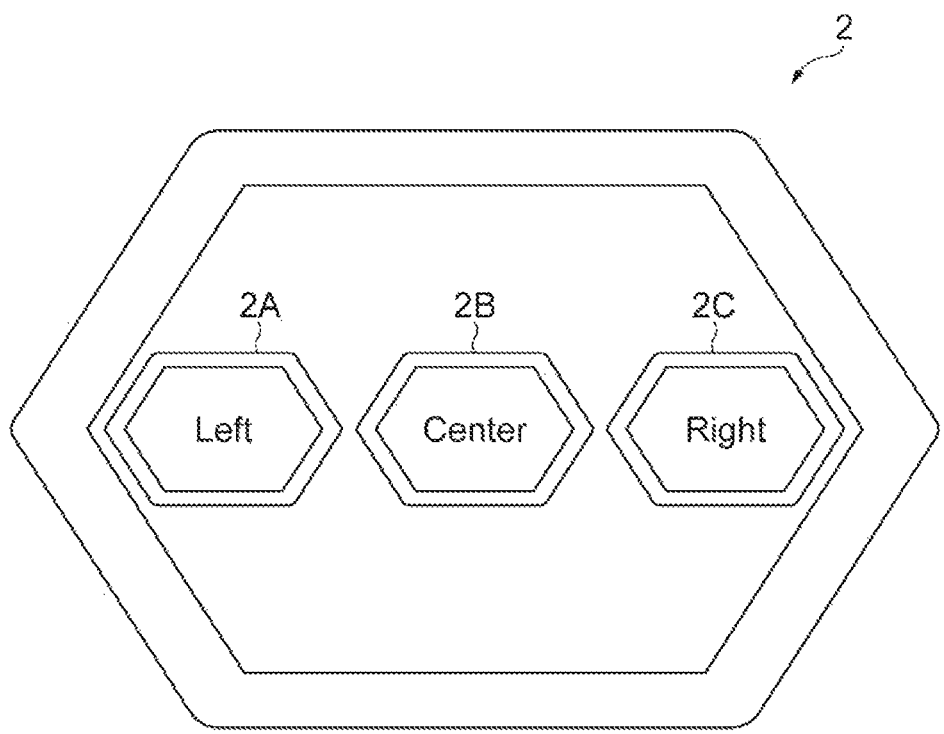
FIG. 3 is a diagram illustrating an example of an operation unit displayed as a virtual image.

FIG. 3 is an example of the operation unit 2 displayed as the virtual image 3. As illustrated in FIG. 3, the operation unit 2 is, for example, an operation screen on which a vehicle-mounted back camera can be operated, and can switch the imaging position of the vehicle-mounted back camera by pressing each button of the operation unit 2. As an example, the operation unit 2 includes a first virtual image button 2A for imaging the left side of the vehicle, a second virtual image button 2B for imaging the rear side of the vehicle, and a third virtual image button 2C for imaging the right side of the vehicle.

FIG. 1 is referred to again. The depth sensor 20 is provided on a side opposite to the object 4 with the operation unit 2 interposed therebetween. In one example, the depth sensor 20 is provided on a virtual straight line that connects the operation unit 2 and the object 4 to each other. The depth sensor 20 acquires distance image data including information of the position (two-dimensional position) of the object 4 on a plane perpendicular to the virtual straight line and information of a distance D1 from the depth sensor 20 to the object 4. The distance image data is acquired as, for example, 640×480 pixels. The depth sensor 20 outputs the acquired distance image data to the control unit 30 at predetermined periods (for example, 1/30 second).

Specifically, the depth sensor 20 emits a light beam (for example, an infrared ray) to each point on an object present in the imaging region including the object 4, and receives the light beam reflected from each point on the object. Then, the depth sensor 20 measures a distance between the depth sensor 20 and each point on the object based on the received light beam, and outputs the measured distance for each pixel.

The distance between the depth sensor 20 and each point on the object is measured by, for example, a Light Coding method. In this method, the depth sensor 20 emits a light beam to each point on the object, which is present in the imaging region including the object 4, in a random dot pattern. Then, the depth sensor 20 receives the light beam reflected from each point on the object and detects the distortion of the pattern of the reflected light beam to measure the distance between the depth sensor 20 and each point on the object. The depth sensor 20 detects the information of the two-dimensional position of each point on the object and the information of the distance from the depth sensor 20 to each point on the object as a plurality of pixels, and outputs the plurality of detected pixels to the control unit 30.

The control unit 30 can communicate with the depth sensor 20 and the liquid crystal panel 12. The control unit 30 includes, for example, a CPU 31 (Central Processing Unit) that executes a program, a storage unit 32 such as a ROM (Read Only Memory) and a RAM (Random Access Memory), an input and output unit 33, and a driver 34. The function performed by each functional component of the control unit 30 is realized by operating the input and output unit 33 and reading and writing data in the storage unit 32 under the control of the CPU 31. The form and location of the control unit 30 are not particularly limited.

Figure 4:
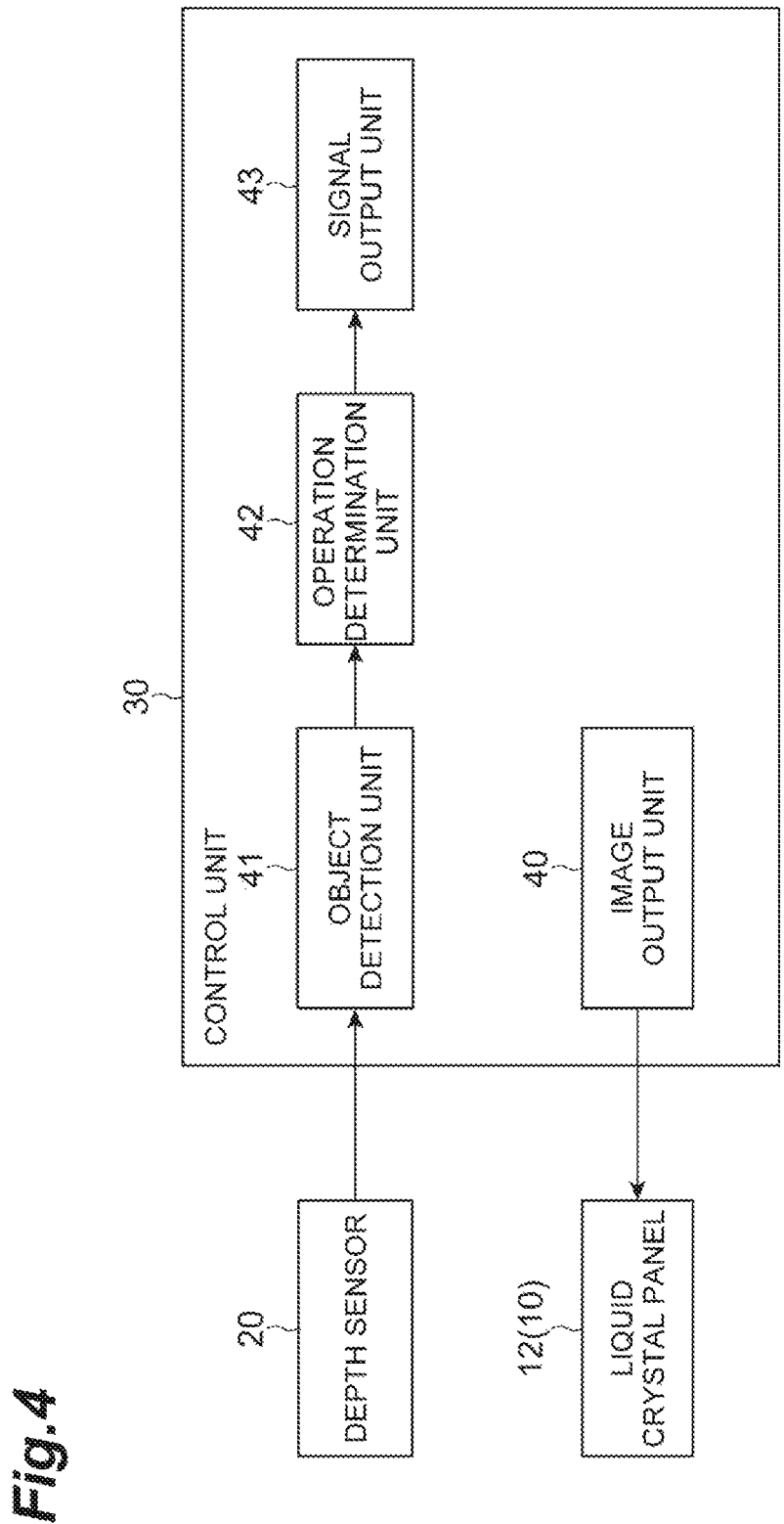
FIG. 4 is a functional block diagram of a control unit of the operation detection device illustrated in FIG. 1.

FIG. 4 is a functional block diagram of the control unit 30. As illustrated in FIG. 4, the control unit 30 has an image output unit 40, an object detection unit 41, an operation determination unit 42 (determination unit), and a signal output unit 43 as functional components. The image output unit 40 outputs image data of an image displayed on the liquid crystal panel 12 to the liquid crystal panel 12. The image displayed on the liquid crystal panel 12 is not limited to the operation screen illustrated in FIG. 3. The liquid crystal panel 12 can display various kinds of images based on the image data from the image output unit 40.

Figure 5:
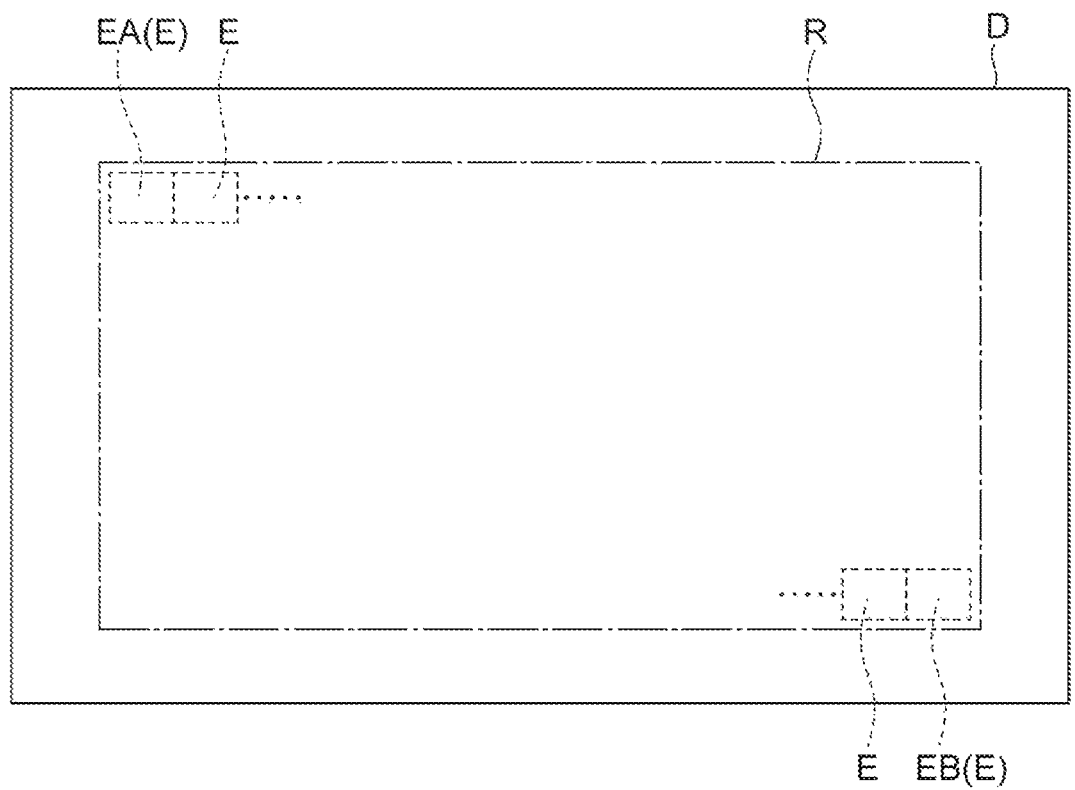
FIG. 5 is a diagram illustrating an example of distance image data output by a sensor of the operation detection device illustrated in FIG. 1.

The object detection unit 41 detects the object 4 based on the distance image data output from the depth sensor 20. FIG. 5 is a diagram schematically illustrating distance image data D output from the depth sensor 20. When the distance image data D is input from the depth sensor 20, the object detection unit 41 sets a scanning region R for the distance image data D. The scanning region R is, for example, a region to be scanned in the distance image data D. The object detection unit 41 sets, for example, a region including the center of the distance image data D (that is, a region excluding an end portion of the distance image data D) as the scanning region R. As described above, the object detection unit 41 sets the region including the center of the distance image data D as the scanning region R, so that the speed of detecting the object 4 can be increased. The object detection unit 41 may set the entire distance image data D as the scanning region R.

For example, the object detection unit 41 sets the position of a pixel EA at one corner on the diagonal of the rectangular scanning region R, among a plurality of pixels E in the scanning region R, as a scanning start position and sets the position of a pixel EB at the other corner as a scanning end position, and sequentially scans the pixel EA to the pixel EB for each pixel E in the scanning region R. Information of the distance between the depth sensor 20 and each point on the object is associated with each pixel E. The object detection unit 41 scans each pixel E in the scanning region R, and detects the presence or absence of the object 4 depending on whether or not the distance associated with each pixel E is equal to or less than a predetermined value, for example. When the object 4 is detected, the object detection unit 41 outputs position data indicating the position of the object 4 to the operation determination unit 42.

FIG. 4 is referred to again. The operation determination unit 42 determines, based on the position data output from the object detection unit 41, whether or not the operation unit 2 has been pressed by the object 4. Specifically, the operation determination unit 42 determines whether or not the distance D1 between the depth sensor 20 and the object 4 is equal to or less than a threshold value T, as illustrated in FIG. 1. Then, when the object 4 reaches a virtual pressing determination surface S, the operation determination unit 42 determines that the distance D1 is equal to or less than the threshold value T, and determines that the operation unit 2 has been pressed. The pressing determination surface S is a virtual surface formed in a region where the distance from the depth sensor 20 is constant.

The operation determination unit 42 determines that the operation unit 2 has been pressed by the object 4 before the object 4 reaches the operation unit 2. By setting the threshold value T that is larger than a distance D2 between the depth sensor 20 and the operation unit 2, the pressing determination surface S is provided in front of the operation unit 2 when viewed from the object 4. For example, the distance D2 is 100 mm and the threshold value T is 120 mm, but these values can be appropriately changed. The operation determination unit 42 determines that the operation unit 2 has been pressed when it is determined that the object 4 has reached the pressing determination surface S and the distance D1 is equal to or less than the threshold value T.

Specifically, the pressing determination surface S is provided at a position spaced apart from the operation unit 2 toward the object 4 by a distance d1. The distance d1 is a distance between the operation unit 2 and the pressing determination surface S, and corresponds to the difference between the threshold value T and the distance D2 from the depth sensor 20 to the operation unit 2. The distance d1 is, for example, half the radius of a circular button when the circular button is displayed as the virtual image 3. The distance d1 is, for example, 10 mm to 30 mm, preferably 15 mm to 25 mm, but the value of the distance d1 can be appropriately changed. In the present embodiment, the value of the distance d1 is 20 mm.

When the operation determination unit 42 determines that the pressing operation on the operation unit 2 has been performed, the signal output unit 43 generates a control signal based on the pressing operation on the operation unit 2. The signal output unit 43 outputs the generated control signal to a device, such as the vehicle-mounted back camera described above, and the device operates by receiving the control signal from the signal output unit 43. In the example illustrated in FIG. 3, when the operation determination unit 42 determines that the pressing operation on the first virtual image button 2A, the second virtual image button 2B, or the third virtual image button 2C has been performed, the signal output unit 43 outputs a control signal to the vehicle-mounted back camera. The vehicle-mounted back camera displays one of an image of the left side of the vehicle, an image of the rear side of the vehicle, and an image of the right side of the vehicle based on the input control signal.

Figure 6:
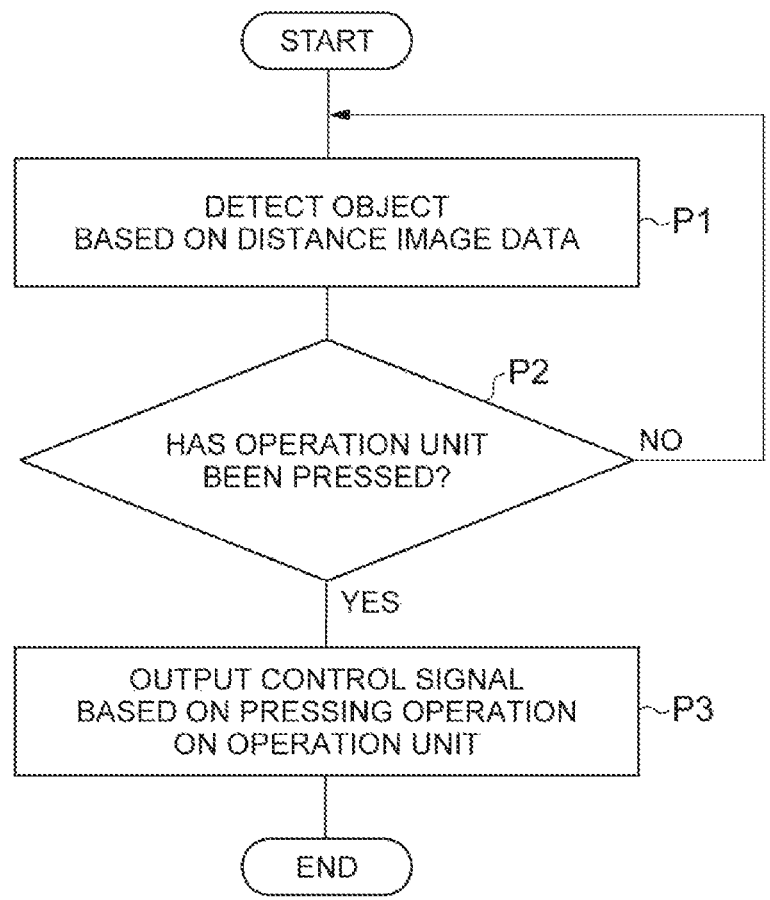
FIG. 6 is a flowchart illustrating an example of the operation of the operation detection device.

Next, the operation of the operation detection device 1 will be described. In addition, an operation detection method of the present embodiment will be described. The operation of the operation detection device 1 is executed by the CPU 31 that reads and executes the program stored in the storage unit 32, for example. FIG. 6 is a flowchart illustrating an example of the operation of the operation detection device 1. First, the depth sensor 20 acquires the distance image data D including information of the two-dimensional position of the object 4 and information of the distance D1 from the depth sensor 20 to the object 4, and outputs the acquired distance image data D to the control unit 30. The object detection unit 41 detects the object 4 based on the input distance image data D (step P1). At this time, the object detection unit 41 may detect the object 4 by specifying the pixel E, which indicates that the distance between the depth sensor 20 and the object 4 is short, among the plurality of pixels E of the distance image data D. When the object 4 is detected, the object detection unit 41 outputs position data indicating the position of the object 4 to the operation determination unit 42.

Then, the operation determination unit 42 determines, based on the position data output from the object detection unit 41, whether or not the operation unit 2 has been pressed by the object 4 (step P2). When it is determined that the object 4 has reached the pressing determination surface S provided in front of the operation unit 2 when viewed from the object 4 and the distance D1 is equal to or less than the threshold value T (YES in step P2), the operation determination unit 42 determines that the operation unit 2 has been pressed. On the other hand, when it is determined that the object 4 has not reached the pressing determination surface S and the distance D1 is not equal to or less than the threshold value T (NO in step P2), the operation determination unit 42 determines that the operation unit 2 has not been pressed. When it is determined that the operation unit 2 has not been pressed, the process returns to step P1 to continuously execute step P1 of detecting the object 4.

When the operation determination unit 42 determines that the pressing operation on the operation unit 2 has been performed (YES in step P2), the signal output unit 43 generates a control signal based on the pressing operation on the operation unit 2. The signal output unit 43 outputs the generated control signal to a device, such as the vehicle-mounted back camera described above, and the device operates by receiving the control signal from the signal output unit 43 (step P3). Then, a series of steps are completed.

Subsequently, effects obtained by the operation detection device 1 and the operation detection method of the present embodiment will be described. In the present embodiment, since the operation unit 2 is displayed as the virtual image 3, the operation unit 2 can be displayed as if the operation unit 2 floats. By displaying the operation unit 2 as if the operation unit 2 floats in this manner, the visibility of the operation unit 2 can be improved. In addition, in the operation detection device 1 and the operation detection method of the present embodiment, it is determined that the operation unit 2 has been pressed before the object 4 reaches the operation unit 2. That is, before the object 4 reaches the operation unit 2, pressing determination indicating that the operation unit 2 has been pressed is made. Therefore, the pressing determination is made before the object 4 actually reaches the operation unit 2, and the operation of the device by the pressing operation can be performed early. As a result, the user U can feel that the reaction of the pressing operation is good.

By performing the pressing determination before the object 4 reaches the operation unit 2, it is possible to suppress the occurrence of a phenomenon that the pressing determination is not made even though the user U thinks that the operation unit 2 has been pressed. Accordingly, since it is possible to perform the pressing determination when the user U thinks that the operation unit 2 has been pressed, the user U can feel that the pressing operation has been performed as intended by the user U. Therefore, according to the operation detection device 1 and the operation detection method described above, the user U can feel that the operability of the operation unit 2 is good.

As illustrated in FIG. 1, the operation determination unit 42 determines that the operation unit 2 has been pressed when the object 4 reaches the pressing determination surface S provided in front of the operation unit 2 when viewed from the object 4. Therefore, it is possible to realize the pressing determination indicating that the object 4 has been pressed with a simple configuration.

The depth sensor 20 is provided on a side opposite to the object 4 with the operation unit 2 interposed therebetween. Incidentally, when a deviation occurs between an approach direction in which the object 4 approaches the operation unit 2 and each direction indicated by the coordinate axis of the depth sensor 20, it may be necessary to perform coordinate conversion processing on the coordinate system of the depth sensor 20 in order to correctly detect the position of the object 4. On the other hand, when the depth sensor 20 is provided on the side opposite to the object 4 with the operation unit 2 interposed therebetween, the depth sensor 20 is disposed on the side opposite to the object 4 when viewed from the operation unit 2, so that the load of the coordinate conversion processing described above can be reduced. Therefore, the processing load of the operation detection device 1 can be reduced.

Second Embodiment

Next, an operation detection device and an operation detection method of the second embodiment will be described. The second embodiment is different from the first embodiment in that an operation determination unit (determination unit) detects the speed of the object 4 approaching the operation unit 2 and determines whether or not the operation unit 2 has been pressed based on the detected speed and the position of the object 4. In the following description, description overlapping the first embodiment will be appropriately omitted.

In the second embodiment, for example, the depth sensor 20 sequentially outputs the distance image data D to the control unit 30 at predetermined periods at times t1, t2, t3, . . . [s]. Then, for example, it is assumed that the distance D1 between the object 4 and the operation unit 2 at time t1 is 15 mm and the distance D1 at the next time t2 is 5 mm. In this case, since the speed of the object 4 is 10/(t2−t1) [mm/s], it is predicted that the object 4 will reach the operation unit 2 by the next time t3. For example, even if the period (that is, t2−t1) at which the distance image data D is output from the depth sensor 20 is about ⅓₀ second, it can be determined that the operation unit 2 has been pressed one period or two periods before the time t3 (at the point in time of time t1 or time t2).

As described above, in the second embodiment, the operation determination unit detects the speed of the object 4 approaching the operation unit 2, and determines whether or not the operation unit 2 has been pressed based on the detected speed and the position of the object 4. Incidentally, in the case of performing the pressing determination when the object 4 reaches the pressing determination surface S, for example, when the user U slowly moves the object 4 to bring the object 4 close to the operation unit 2, the user U may recognize that the pressing determination has been made earlier than expected due to the object 4 reaching the pressing determination surface S earlier than expected. On the other hand, when the operation determination unit performs the pressing determination based on the speed and the position of the object 4 as in the second embodiment, the pressing determination can be performed based on the time-series change of the position of the object 4. Accordingly, the pressing determination can be performed after grasping the degree of progress of the object 4. Therefore, since it is possible to make a determination considering the prediction of the position of the object 4 by performing the pressing determination on the operation unit 2 based on the speed and the position of the object 4, it is possible to more accurately perform the pressing determination on the operation unit 2.

Each embodiment of the operation detection device and the operation detection method according to the present disclosure have been described above. However, the present disclosure is not limited to each embodiment described above, and may be modified or applied to other things without departing from the scope described in the claims. That is, the content and order of each step of the operation detection method and the configuration of each unit of the operation detection device can be appropriately changed without departing from the scope of the claims.

For example, in the above-described embodiments, the depth sensor 20 measures the distance between the depth sensor 20 and each point on the object using the Light Coding method, but the measurement is not limited to this method. For example, the depth sensor 20 may measure the distance between the depth sensor 20 and each point on the object using a TOF (Time of Flight) method. In the TOF method, the depth sensor 20 calculates the flight time (that is, delay time) of a light beam until the a light beam is reflected at each point on the object and reaches the depth sensor 20, and the distance between the depth sensor 20 and each point on the object is measured from the calculated flight time and the speed of light. Even in such a form, the same effect as that of each embodiment described above can be obtained.

In each of the above-described embodiments, the depth sensor 20 that acquires the information of the distance D1 from the object 4 is used as a sensor that detects the object 4. However, a sensor other than the depth sensor 20 may be used. That is, instead of the depth sensor 20, for example, an infrared sensor, an ultrasonic sensor, or the like may be used, and the type of sensor can be appropriately changed.

Figure 7:
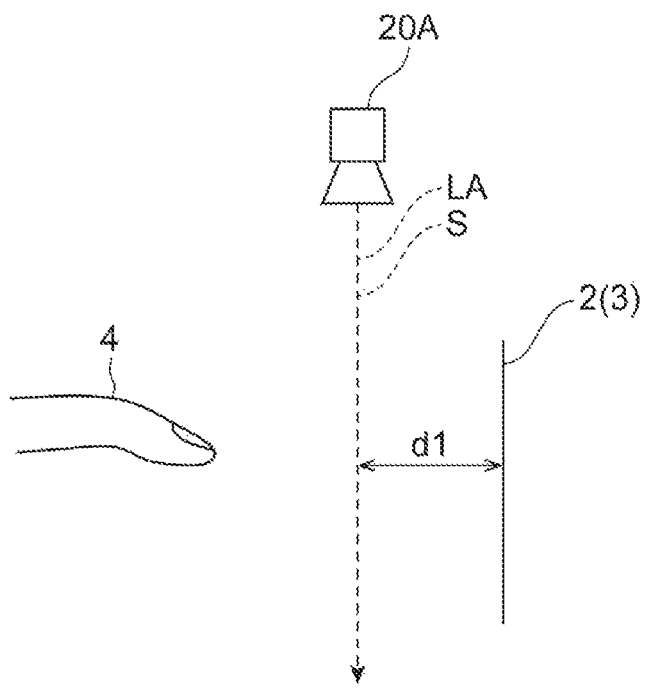
FIG. 7 is a diagram illustrating a modification example of a sensor.

FIG. 7 illustrates an operation detection device including a sensor 20A according to a modification example. The sensor 20A is a reflection type photosensor that emits a light beam (for example, an infrared ray) LA in a direction crossing an approach direction, in which the object 4 approaches the operation unit 2, and detects the object 4 when the object 4 comes in contact with the emitted light beam LA. The sensor 20A is disposed in a direction crossing the approach direction, in which the object 4 approaches the operation unit 2, with respect to the object 4 and the operation unit 2. That is, the sensor 20A is provided on the extension surface of the pressing determination surface S.

The emission position of the light beam LA by the sensor 20A (that is, the position of the pressing determination surface S) is provided in front of the operation unit 2 when viewed from the object 4. Accordingly, the operation determination unit 42 determines that the operation unit 2 has been pressed before the object 4 reaches the operation unit 2. Therefore, even when the sensor 20A is used, the same effect as that of each embodiment described above can be obtained.

In each embodiment described above, an example has been described in which the operation unit 2 includes the first virtual image button 2A, the second virtual image button 2B, and the third virtual image button 2C. However, the layout and type of the operation unit can be appropriately changed. The operation detection device may be a device that detects an operation on the operation unit for operating each device other than the vehicle, and the operation detection device and the operation detection method can be applied to various devices other than the vehicle.

REFERENCE SIGNS LIST

1: operation detection device, 2: operation unit, 3: virtual image, 4: object, 10: display unit, 20: depth sensor, 30: control unit, 41: object detection unit, 42: operation determination unit, S: pressing determination surface.

What is claimed is:
1. An operation detection device, comprising:
a display unit that displays an operation unit as a virtual image;
a sensor that detects a position of an object approaching the operation unit; and
a determination unit that detects a speed of the object approaching the operation unit, wherein
the sensor detects distance image data between the object and the operation unit and sequentially outputs the distance image data to the determination unit at predetermined time periods such that the determination unit predicts a time in which the object will reach the operation unit, and
the determination unit determines whether or not the operation unit has been pressed based on the detected speed of the object and the position of the object detected by the sensor such that the determination unit determines that the operation unit has been pressed before the object reaches the operation unit.
2. The operation detection device according to claim 1, wherein the determination unit determines that the operation unit has been pressed when the object reaches a pressing determination surface provided in front of the operation unit when viewed from the object.
3. The operation detection device according to claim 1, wherein the sensor is a depth sensor provided on a side opposite to the object with the operation unit interposed therebetween.
4. The operation detection device according to claim 1, wherein the sensor is a depth sensor that calculates a flight time of a light beam from the depth sensor until the light beam returns to the depth sensor after being reflected off of the object, and
wherein a distance between the depth sensor and the object is measured from the calculated flight time and the speed of light.
5. The operation detection device according to claim 1, wherein the sensor is one of a depth sensor, an infrared sensor, or an ultrasonic sensor.
6. An operation detection device, comprising:
a display unit that displays an operation unit as a virtual image;
a sensor that detects a position of an object approaching the operation unit; and a determination unit that determines whether or not the operation unit has been pressed based on the position of the object detected by the sensor, wherein the sensor is provided on a side opposite to the object with the operation unit interposed therebetween, the sensor detects distance image data between the object and the operation unit and sequentially outputs the distance image data to the determination unit at predetermined time periods such that the determination unit predicts a time in which the object will reach the operation unit, and the determination unit determines that the operation unit has been pressed before the object reaches the operation unit.

7. The operation detection device according to claim 6, wherein the sensor is a depth sensor that calculates a flight time of a light beam from the depth sensor until the light beam returns to the depth sensor after being reflected off of the object, and wherein a distance between the depth sensor and the object is measured from the calculated flight time and the speed of light.

8. The operation detection device according to claim 4, wherein the sensor is one of a depth sensor, an infrared sensor, or an ultrasonic sensor.

9. An operation detection device, comprising:

a display unit that displays an operation unit as a virtual image;

a sensor that detects a position of an object approaching the operation unit in an approach; and a determination unit that determines whether or not the operation unit has been pressed based on the position of the object detected by the sensor, wherein the sensor detects distance image data between the object and the operation unit and sequentially outputs the distance image data to the determination unit at predetermined time periods such that the determination unit predicts a time in which the object will reach the operation unit, the sensor emits a light beam in a direction extending along a pressing determination surface of the operation unit such that when the object crosses the emitted light beam at the pressing determination surface the sensor detects the object approaching the operation unit, and the determination unit determines that the operation unit has been pressed before the object reaches the operation unit.

10. The operation detection device according to claim 9, wherein the sensor is a depth sensor that calculates a flight time of the emitted light beam from the depth sensor until the light beam returns to the depth sensor after being reflected off of the object, and wherein a distance between the depth sensor and the object is measured from the calculated flight time and the speed of light.

11. The operation detection device according to claim 9, wherein the sensor is one of a depth sensor, an infrared sensor, an ultrasonic sensor, or a reflection-type photosensor.

* * * * *